(12) United States Patent
Davies

(10) Patent No.: US 7,620,697 B1
(45) Date of Patent: Nov. 17, 2009

(54) ONLINE SYNDICATED CONTENT FEED METRICS

(75) Inventor: Trenton Davies, Midvale, UT (US)

(73) Assignee: Omniture, Inc., Orem, UT (US)

( * ) Notice: Subject to any disclaimer, the term of this patent is extended or adjusted under 35 U.S.C. 154(b) by 692 days.

(21) Appl. No.: 11/373,381

(22) Filed: Mar. 10, 2006

(51) Int. Cl.
G06F 15/16 (2006.01)
G06F 15/173 (2006.01)

(52) U.S. Cl. ............... 709/217; 709/219; 709/224

(58) Field of Classification Search ............ None
See application file for complete search history.

(56) References Cited

U.S. PATENT DOCUMENTS

| | | | |
|---|---|---|---|
| 2003/0200140 A1 | 10/2003 | Hars | |
| 2005/0165615 A1 | 7/2005 | Minar | |
| 2005/0188403 A1 | 8/2005 | Kotzin | |
| 2005/0267973 A1 | 12/2005 | Carlson | |
| 2006/0095507 A1* | 5/2006 | Watson | 709/203 |
| 2006/0277291 A1* | 12/2006 | Misbach | 709/224 |
| 2007/0088832 A1* | 4/2007 | Tsang et al. | 709/227 |
| 2007/0100959 A1* | 5/2007 | Eichstaedt et al. | 709/217 |
| 2007/0198701 A1* | 8/2007 | Pindra et al. | 709/224 |

OTHER PUBLICATIONS

N. Saito, "The Local Fourier Dictionary: A Natural Tool . . . ", Wavelet Applications in Signal and Image Processing VII (Unser et al., eds), Proc. SPIE 3813, pp. 610-6124, 1999.*
J-P. Micek, "RSS Traffic Tracking", www.advancebusinessblogging.com, Jan. 22, 2005.*
SiteCatalyst Implementation Manual, downloaded Oct. 18, 2006 from http://w2.byuh.edu/webmasters/, copyright Oct. 28, 2005.
A. C. Gilbert et al., "One-pass wavelet decompositions of data streams", IEEE Transactions on Knowledge and Data Engineering, vol. 15, No. 3, pp. 541-554, 2003.
Ian Kaplan, "Wavelets and Signal Processing", www.bearcave.com, copyright 2001-2003.
H. Liu et al., "Client Behavior and Feed Characteristics of RSS, a Publish-Subscribe System for Web Micronews", Proc. IMC '05: Internet Measurement Conference, pp. 29-34, 2005.
W. Sweldens, "The Lifting Scheme: A New Philosophy . . . ", Wavelet Applications in Signal and Image Processing III (Laine et al., eds), Proc. SPIE 2569, pp. 68-79, 1995.
Abstract of G. Fernández et al, "LIFTPACK: A Software Package for Wavelet Transforms using Lifting", cm.bell-labs.com, (Feb. 26, 2006).

(Continued)

*Primary Examiner*—Hassan Phillips
(74) *Attorney, Agent, or Firm*—Ogilvie Law Firm

(57) ABSTRACT

Tools and techniques are provided to help estimate the number of unique subscribers to an RSS, Atom, or other online syndicated content feed. Methods, systems, and other embodiments separate feed polling events into groups based at least partially on regularity in their times of occurrence. Grouping of polling events may also be based on client values, such as a client's IP address or user agent identification. Each located group corresponds to one likely subscriber in an estimation of the total number of subscribers to the feed. The use of occurrence times and client header values may be combined with unique URLs, cookies, and other tools to further refine readership estimates.

21 Claims, 3 Drawing Sheets

OTHER PUBLICATIONS

R. Hrastnik, "ClickZ Doesn't Get RSS Metrics—How We Really Can Measure RSS", rssdiary.marketingstudies.net, Aug. 11, 2005.
S. Spencer, "RSS and SEO: Implications for Search Marketers", www.stephanspencer.com, Mar. 2, 2005.
D. McLellan, "Podcast Aggregators Should Support Cookies", allinthehead.com, Mar. 8, 2005.
J. Udell, "The business of RSS", weblog.infoworld.com/udell, May 28, 2003.
T. Bray, "Counting Subscribers", www.tbray.org/ongoing, May 25, 2003.
M. Nottingham, "RSS, Subscribers and Business Models (oh, my!)", www.mnot.net/blog, May 25, 2003.
J. Brome, "Counting Subscribers", www.jasonbrome.com/blog, May 27, 2003.
L. Notenboom, "Is there a way to track unique subscribers to my RSS feed?", ask-leo.com, Jan. 3, 2004.
A. Gahran, "How Many People Read Your Webfeed?", contentious.com, Jun. 3, 2004.
A. Gahran, "Estimating RSS Readership: One Suggestion", contentious.com, Mar. 11, 2004.
M. Hedlund, "Anticipating RSS Spam", www.oreillynet.com, Mar. 23, 2004.
Pages from www.syndicateiq.com, available in shown form no later than Jan. 16, 2006, available in some form at least as early as Jan. 18, 2005.
"Definitions of xslt on the Web", www.google.com, Jan. 16, 2006.
Pages from www.imninc.com, no later than Jan. 16, 2006.
D. Winer, "Bootstrap: How to redirect an RSS feed", radio.userland.com/stories, Oct. 21, 2002.
O. Malik, "RSS, Tiger Safari and the Bandwidth Bottleneck", www.gigaom.com, Apr. 18, 2005.
"Quick reference to HTTP headers", www.cs.tut.fi/~jkorpela, Apr. 6, 2004.
Excerpts from "All Things Distributed", weblogs.cs.cornell.edu, Mar. 18, 2004.
"Definitions of fourier analysis on the Web", www.google.com, Feb. 19, 2006.
A. Gahran, "The Holy Grail: Trackable RSS", www.poynter.org, Mar. 3, 2004.
"Atom (standard)", en.wikipedia.org, no later than Feb. 20, 2006.
"Really Simple Stealing", avc.blogs.com, Jul. 12, 2005.
R. Hrastnik, "RSS Metrics Focus: Interview . . . ", rssdiary.marketingstudies.net, Jun. 14, 2005.
J-P. Micek, "RSS Traffic Tracking", www.advancedbusinessblogging.com, Jan. 22, 2005.
S. Falkow, "Online PR and Media Relations", falkow.blogsite.com, Feb. 22, 2006.
T. Jarrett, "Measuring blogs . . . ", www.jarretthousenorth.com, mid-2003.
R. Hrastnik, "RSS Works: Hard Metrics to Prove It", www.rss-specifications.com, copyright 2005.
R. Hrastnik, "New RSS Metrics Service from Pheedo . . . ", rssdiary.marketingstudies.net, Nov. 16, 2005.
Pages from www.feedburner.com, no later than Jan. 16, 2006.
R. Hrastnik, "RSS Industry Night Roundtable: IRSS Solution Coming", rssdiary.marketingstudies.net, Dec. 14, 2005.
S. Gatz, "Last Night's RSS Marketing Industry 'Roundtable'", www.scottgatz.com/blog, Dec. 13, 2005.
H. Lee, "The Summary of RSS Industry Night Roundtable", marketingloop.com/syndication, Dec. 14, 2005.
"RSS feeds with changing enclosure URLs", www.kryogenix.org, Jul. 10, 2005.
"All About RSS", www.faganfinder.com, Feb. 19, 2004.
"Definitions of rss on the Web", www.google.com, Jan. 16, 2006.
"What is 2o7.net?", www.omniture.com, no later than Jan. 16, 2006, copyright 1996-2005.
M. Arrington, "Is FeedBurner Pushing the Envelope on Trust?", www.techcrunch.com, Dec. 7, 2005.
Statement from John W. Ogilvie, Sep. 28, 2006.
Form for PTO 1449 for U.S. Appl. No. 10/608,515 (1 sheet), (Sep. 28, 2006).
Forms for PTO 1449 for U.S. Appl. No. 10/609,008 (2 sheets), (Sep. 28, 2006).
Forms for PTO 1449 for U.S. Appl. No. 10/759,079 (2 sheets), (Sep. 28, 2006).
Forms for PTO 1449 for U.S. Appl. No. 10/794,809 (3 sheets), (Sep. 28, 2006).
Forms for PTO 1449 for U.S. Appl. No. 10/993,397 (2 sheets), (Sep. 28, 2006).
Form for PTO 1449 for U.S. Appl. No. 11/274,560 (1 sheet), (Sep. 28, 2006).
Form for PTO 1449 for U.S. Appl. No. 11/313,445 (1 sheet), (Sep. 28, 2006).
Forms for PTO 1449 for U.S. Appl. No. 11/313,588 (4 sheets), (Sep. 28, 2006).
Petition to Make Special for U.S. Appl. No. 11/313,588, May 17, 2006.
Form for PTO 1449 for U.S. Appl. No. 11/313,875 (1 sheet), (Sep. 28, 2006).
Forms for PTO 1449 for U.S. Appl. No. 11/313,970 (4 sheets), (Sep. 28, 2006).
Petition to Make Special for U.S. Appl. No. 11/313,970, May 17, 2006.
Form for PTO 1449 for U.S. Appl. No. 11/319,337 (1 sheet), (Sep. 28, 2006).
Form for PTO 1449 for U.S. Appl. No. 11/341,231 (1 sheet), (Sep. 28, 2006).
Forms for PTO 1449 for U.S. Appl. No. 11/367,198 (2 sheets), (Sep. 28, 2006).
Form for PTO 1449 for U.S. Appl. No. 11/458,313 (1 sheet), (Sep. 28, 2006).
International Search Report for PCT/US04/39253, (Sep. 28, 2006).
International Search Report for PCT/US04/06898, (Sep. 28, 2006).
International Search Report for PCT/US04/06696, (Sep. 28, 2006).
Jason I. Hong et al., "WebQuilt: A Framework for Capturing and Visualizing the Web Experience", guir.berkeley.edu, May 2001.
Jason I. Hong et al., "What Did They Do? Understanding Clickstreams with the WebQuilt Visualization System", guir.berkeley.edu, (Sep. 28, 2006).
"Advertisement System, Method and Computer Program Product," IP.com, Document ID IPCOM000138557D, Jul. 24, 2006.

* cited by examiner

ONLINE SYNDICATED CONTENT FEED METRICS

BACKGROUND

Online syndicated content feeds, such as RSS feeds, are an increasingly popular mechanism for distributing information. As noted in part of a Wikipedia article under the heading "RSS (file format)":

> Web feeds are widely used by the weblog community to share the latest entries' headlines or their full text, and even attached multimedia files. (See podcasting, vodcasting, broadcasting, screencasting, Vloging, and MP3 blogs.) In mid 2000, use of RSS spread to many of the major news organizations, including Reuters, CNN, and the BBC. These providers allow other websites to incorporate their "syndicated" headline or headline-and-short-summary feeds under various usage agreements. RSS is now used for many purposes, including marketing, bug-reports, or any other activity involving periodic updates or publications.
>
> A program known as a feed reader or aggregator can check a list of feeds on behalf of a user and display any updated articles that it finds. It is common to find web feeds on major websites and many smaller ones. Some websites let people choose between RSS or Atom formatted web feeds; others offer only RSS or only Atom.
>
> RSS-aware programs are available for various operating systems (see list of news aggregators). Client-side readers and aggregators are typically constructed as standalone programs or extensions to existing programs such as web browsers. Browsers are moving toward integrated feed reader functions, such as Opera browser and Mozilla Firefox.
>
> Web-based feed readers and news aggregators require no software installation and make the user's "feeds" available on any computer with Web access. Some aggregators combine existing web feeds into new feeds, e.g., taking all football related items from several sports feeds and providing a new football feed. There are also search engines for content published via web feeds like Feedster or Blogdigger. (from http://en.wikipedia.org/wiki/RSS_(protocol); links removed)

However, it has been difficult or impossible to gather desired usage metrics for RSS and other feeds. Some metrics, such as a reliable count of the number of unique users, have been harder to gather for feeds than for other types of online information sources. Unlike feed usage, web site usage via browsers is regularly tracked and analyzed by commercially available web analytics services, which gather detailed data about web page usage, and to some extent about particular web site users. One leading web analytics provider is Omniture, Inc., of Orem, Utah, the owner of the present invention. Omniture provides web analytics technology under its well-known mark SiteCatalyst™.

Simply counting the number of times a feed file is accessed will not reliably reveal the number of subscribers, because a given subscriber's aggregator may poll the feed every ten minutes, while another subscriber's aggregator polls the feed once an hour. A dozen feed file accesses could mean that one person accessed the feed a dozen times, or that a dozen people each accessed the feed once, or some combination in between.

Identifying unique users of a feed allows one to state with confidence the number of readers. This circulation number may then be used to set advertising rates, to influence search engine rankings, to assert bragging rights within a community, and/or for other purposes. Moreover, distinguishing one feed subscriber from another also opens the door to personalized feeds, based on the demonstrated interest of a given subscriber, on the subscriber's stated preferences, and/or other criteria. Targeted advertising, customer profile building, poll throttling, and other subscriber-specific actions may also then be done. In short, significant benefits may follow from counting and/or individually identifying the subscribers to a given feed.

Suggestions have been made for ways to measure feed usage and/or count unique feed users. Several suggestions are discussed in documents submitted with the present application, but for convenience a brief introduction is also given here.

According to a "registered user only" approach, one or more security measures (passwords, usernames, encryption, and the like) are employed so that feeds are made available only to registered users. The number of registered users is then close to, and perhaps even exactly the same as, the number of subscribers. However, there is clear reluctance on the part of many people to require, or to submit to, a registration process for feeds.

According to a "unique URL" approach, each subscriber receives a feed which is associated with a URL containing a user-specific identifier. In some cases, the unique URL is generated and assigned when a user is redirected from the web page that offers feed access, to a page providing feed access. According to one proposal, the identifier is generated from a user's email address using a hash function. Using unique URL feeds makes it possible, for instance, to connect individual feed usage with user registration data. However, a unique URL may in some cases be syndicated to more than one person, or it may be manually given to the original subscriber's friend. In such cases, the number of subscribers may well be more than the number of unique URLs in use.

According to a "cookies" approach, each subscriber has a unique ID which is stored in a cookie data structure on the user's machine, and provided to the feed when a feed download is requested. Cookies can also be used in connection with unique URLs. However, a proponent of using cookies in podcast aggregators, Drew McLellan, notes that their use would complicate the podcasting model, would require support from major podcatchers, and has complications related to portability and privacy. In some cases, there may be one cookie per aggregator per device, even though all those aggregators and devices are used by a single person, so the number of subscribers would be over-counted.

According to a "web bug" approach, a uniquely-named one-pixel image is embedded in a feed's content, which contacts a server when it is loaded into a suitably-equipped browser. Email marketers and web analytics services use web bugs to track email and web site usage. However, use of such bugs in feeds is apparently not widely accepted. RSS feeds, for instance, typically contain little markup, so bloggers are more likely to notice—and remove—embedded web bugs.

According to an "IP address" approach, each feed reader IP address is treated as a unique user. The aggregator or news reader software sends the feed server its IP address when it checks the feed to see if new information is available. But IP addresses do not correspond one-to-one with subscribers. More than one person may use a single machine; each person using the machine sends the same IP address, so readership is under-counted. Moreover, it is not unusual for several machines to reside behind a firewall or gateway that does network address translation, so one IP address seen by a feed may easily correspond to multiple machines, and hence to multiple subscribers. It is also possible for a particular machine, such as a laptop or other portable computing device, or a machine served by an ISP that assigns addresses dynamically, to be assigned different IP addresses at different times. In these cases, counting IP addresses will over-count readership. In a variation of the IP address approach, the IP address is combined with other data, such as the type of feed and the type of software agent serving as aggregator, but the resulting user count is still only an approximation.

One approach suggests estimating RSS readership by dividing the number of hits to an RSS feed file by the "average polling interval". However, a proponent of this approach, Amy Gahran, admits that average polling interval is not a readily available number. Critics of this proposal also point out that average polling interval depends heavily on the specific audience of a site and their computer usage habits. Using IP addresses generally as noted above is then suggested as an alternative to the average polling interval proposal.

Other related concepts will be known or apparent through other sources, not least of which are references such as those of record in the present patent application.

SUMMARY

The present invention provides tools and techniques for counting the number of subscribers to an online syndicated content feed and/or identifying particular subscribers. Some methods of the invention automatically obtain data which represent feed polling events. The data signals correspond to feed polling operations which are performed on behalf of at least two subscribers to the online syndicated content feed. Each feed polling event has an occurrence time and at least one client value. Client values may be based on or include IP addresses, email addresses, user agent header excerpts, and/or other information that helps distinguish one set of users from another set of users. The method automatically locates a group of the feed polling events which is characterized in that events in that group have predictable occurrence times in relation to one another and also share at least one client value with one another. This may be done in part by using an analysis based on polling occurrence times, such as a Fourier analysis, a wavelet analysis, or a select-search-group analysis. Polling events may be grouped first by client value and then by predictable occurrence times, and/or vice versa. These results may be combined with approaches that use unique URLs, web bugs, user registration, IP addresses, and/or cookies. Some embodiments of the invention thus identify a likely unique subscriber, at least in part, by locating a group of feed polling events which are likely performed on behalf of that subscriber. Corresponding systems, configured computer-readable media, data structures, signals, and other embodiments can also be provided according to the present invention.

However, these examples are merely illustrative. The present invention is defined by the claims, and even though this summary helps provide a basis for claims, to the extent this summary conflicts with the claims ultimately granted, those claims should prevail.

DRAWINGS

To illustrate ways in which advantages and features of the invention can be obtained, a description of the present invention is given with reference to the attached drawings. These drawings only illustrate selected aspects of the invention and thus do not fully determine the invention's scope.

DETAILED DESCRIPTION

Introduction

Figure 1:
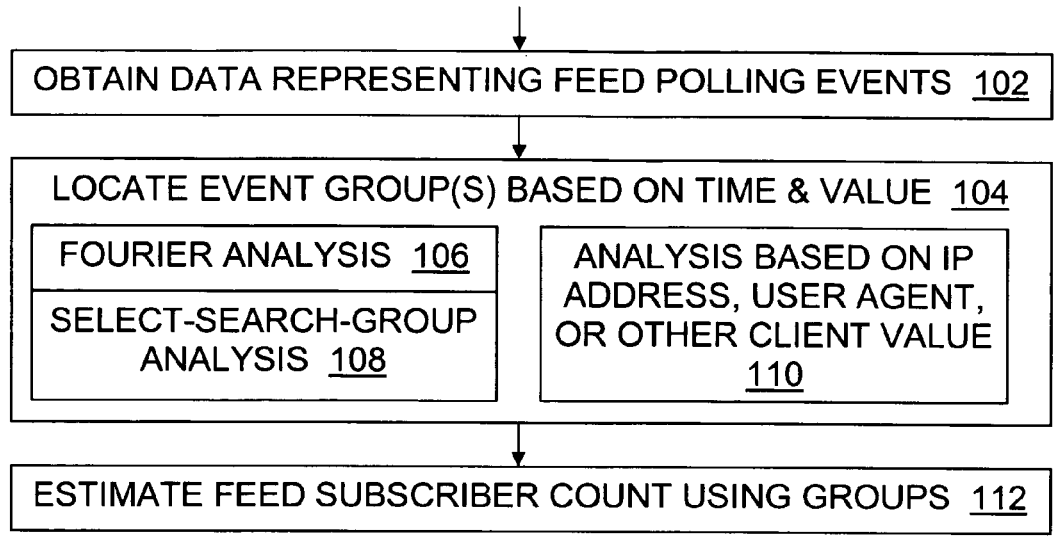
FIG. 1 is a flow chart illustrating methods using, or performed by, a feed metrics system according to at least one embodiment of the present invention

The present invention provides tools and techniques to help measure readership of RSS, Atom, and other online content feeds. Some embodiments of the invention use search algorithms, heuristics, and/or computer-based data analysis of feed occurrence times to group feeds according to the subscriber behind them. The feed occurrence times, and possibly other information, are used to help disambiguate feed records, so that multiple feeds performed on behalf of a single subscriber are not treated as indicative of multiple subscribers. Some embodiments of the invention also help identify particular subscribers; this allows content to be tailored to individual subscribers, for example.

The invention is illustrated in discussions herein and in the drawing figures by specific examples, but it will be appreciated that other embodiments of the invention may depart from these examples. For instance, specific features of an example may be omitted, renamed, grouped differently, repeated, instantiated in hardware and/or software differently, performed in a different order, or be a mix of features appearing in two or more of the examples.

Definitions of terms are provided explicitly and implicitly throughout this document. Terms do not necessarily have the same meaning here that they have in general usage, in the usage of a particular industry, or in a particular dictionary or set of dictionaries. The inventor asserts and exercises his right to be his own lexicographer, with respect to both coined and other terms.

For instance, an "online syndicated content feed" (or "feed" for short) is a data stream sent over a network in response to a polling operation performed on behalf of a subscriber. Some examples, which are not necessarily mutually exclusive of one another, include RSS ("Really Simple Syndication", a.k.a. "Rich Site Summary") feeds, Atom syndication feeds, other XML-based syndication feeds, OPML (Outline Processor Markup Language) feeds, MyST-ML (MyST Markup Language) feeds, Klip (Serence KlipFolio) feeds, Resource Description Framework feeds, Microsoft Office Smart Tag subscription feeds, webfeeds, blog feeds, podcast feeds, and feeds downloaded using aggregator software.

As used herein, collecting feed polling data in "real-time" means collecting it within two hours of its occurrence. That is, "real-time" is used in contrast with logfile analysis or other batched data collection.

As used herein, a "hash value" may be a value that is simply copied from a header or other data structure, or it may be a derived hash that is obtained by sending multiple values and/or M bits through a hash function to obtain a single hash value and/or a value having fewer than M bits. That is, use of a hash function is permitted, but is not required in every case, when getting a "hash value".

As used herein, "automatically" means partially or fully automated.

Many examples herein refer to a computer, but it will be understood that the invention can be embodied in various ways and various contexts. Computers are not the only devices 406 capable of receiving an RSS or other feed; cell phones, mobile phones, wireless devices such as those sold under the Blackberry mark, personal digital assistants such as those sold under the Palm mark, and other devices can also access feeds. Likewise, some examples refer to a client, but RSS feeds and other feeds can also be polled, tracked, analyzed, and so on, in peer-to-peer networks as well as in client-server networks. That is, a "client" 402 may be part of a client-server network or it may be a peer in a peer-to-peer network, or it may be a node in some other type of network. Similarly, although reference is made to IP addresses, other machine-specific or node-specific addresses, such as MAC addresses, processor serial numbers, telephone numbers, and the like, may serve an equivalent role as an address 310 according to the invention in a given embodiment.

Methods and More

Figure 2:
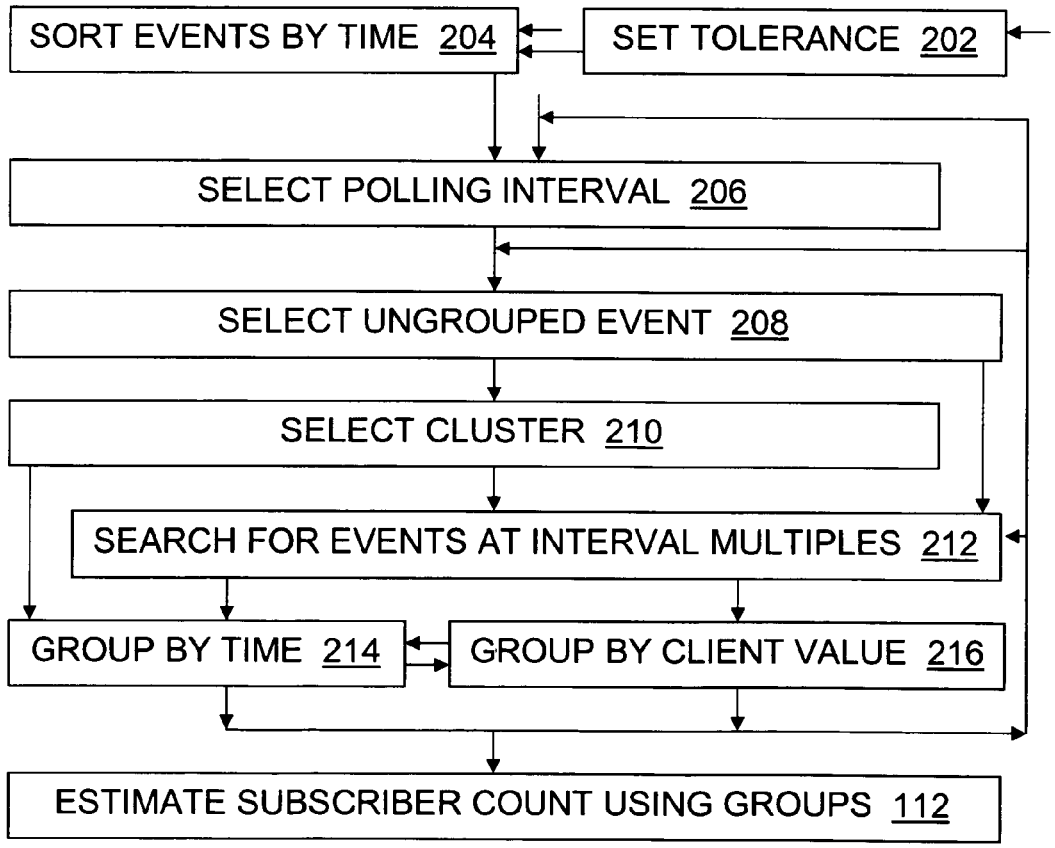
FIG. 2 is flow chart further illustrating methods introduced in FIG. 1, including details of a select-search-group analysis.

FIGS. 1 and 2 are flowcharts illustrating methods of the present invention for using a computer processor in a feed analytics system to analyze and present data representative of feed polling events, and the steps illustrated therein will now be discussed. Note, however, that other drawings and discussion of other embodiments herein may also aid understanding of method embodiments, just as an understanding of methods will sometimes aid understanding of system or other non-method embodiments. Accordingly, reference is made here not only to FIGS. 1 and 2, but also to other figures.

During a data obtaining step 102, a feed analytics system 506 obtains data which represent feed polling events 302 at one or more feed sites 420. The feed polling data 302 may be in the form of electrical signals configuring a memory 410, 524 representing automatic or manual polling of one or more feeds 422 by a client 402 on behalf of a subscriber 404. Any activity or item of a type conventionally tracked by web analytics may have an analogue which can be represented in the polling event data 302, depending of course on the particular embodiment and its implementation. Thus, the data 302 may include signals corresponding to physical objects and activities external to the feed analytics system 506, including actions taken by a feed subscriber's computer, phone and/or other device(s) 406, and subscriber 404 activities directing a device to take action, within the feed site 420.

The step of automatically obtaining 102 data may include parsing a server log 502 and/or tracking feed polling 434 in real-time, for instance. Feed polling event data may be obtained automatically using software and/or hardware familiar in the art. For example, the feed metrics system 506 may include a data obtaining component 510 which is implemented using computer processing and memory hardware 508 configured by software 508. Suitable software 508 may function to extract data 302 about the feed site 420 from a logfile 502 maintained by a server 426. In addition, or alternately, data collection software 510 may collect information about subscriber activity by using content tags in feeds 422, or by a real-time process running on the feed site 420. Feed site activity data may also be obtained by such automatic steps in combination with manual steps (tagging, copying, testing) by a web site or feed site administrator or other technical personnel, in which case the collection is still deemed "automatic" herein, as it is not fully manual.

In one embodiment, a method of identifying a likely unique subscriber 404 to an online syndicated content feed 422 includes automatically obtaining 102 data which represent feed polling events 302. The data signals correspond to feed polling operations 434 which are performed on behalf of at least two subscribers to the online syndicated content feed. Each feed polling event 302 has an occurrence time 304 and also has at least one client value 306.

During a locating step 104, the method automatically locates a group of the feed polling events which is characterized in that events in that group have predictable occurrence times in relation to one another and also share at least one client value with one another. In some embodiments, a group can be defined by a single leftover event 302 after other events have been placed in multi-event groups, and there may be several such singleton groups. In other embodiments, all groups contain multiple events 302.

The events in a group may have predictable occurrence times in relation to one another in one or more of the following ways, for example. One possibility is that all events in the group occur at the same interval or a multiple of that interval. Thus, each event in a group might occur at five minutes, twenty minutes, thirty-five minutes, or fifty minutes, after the hour, that is, at regular fifteen minute intervals. Of course, the important thing about this example is not the value fifteen as a polling interval, but rather the constancy of the polling interval.

Another possibility is that all events in a group occur in clusters. For instance, it may be that all events occur on a Friday evening or a Saturday evening. Even if the polling in the group does not occur at a regular interval, e.g., is done manually, the events may be grouped on the basis that (a) they occur within a specific and recurring range of times (a "cluster"), and (b) they share a client value. This example illustrates that grouping need not be done solely on the basis of polling event occurrence times, although in some cases that might also be done; grouping may use client values in addition to polling times.

A third possibility is that the polling times are pseudo-random, that is, generated using a "random" number generator that is not truly random. One could detect polling that uses a sequence of intervals, e.g., poll, then poll five minutes later, then ten minutes later, then fifteen minutes later, then twenty minutes later, then five minutes later, then ten minutes later, and so on. One could also poll at intervals of approximately twenty minutes, plus or minus up to three minutes, with the amount of difference being based on a sequence of random numbers calculated using some seed value. More generally, it is possible that aggregators will be modified to make polling times more random, in order to distribute feed server loads. Embodiments of the invention may reflect this by increasing the sophistication with which polling event times are predicted.

Other possibilities will also be apparent to a given person of skill in the art. But in general, these various embodiments each identify a likely unique subscriber by locating a group of feed polling events which are likely performed on behalf of that subscriber. Certainty that all the events in a group are performed by a single subscriber, and/or that all events performed by that subscriber are in the group, is not necessary to make an embodiment useful; it is enough that accuracy of readership count and/or identification tends to be increased by using the invention. The extent (e.g., percentage and/or distribution of errors) to which occurrence times 304 are predictable is also one way to measure the likelihood that a group corresponds to a unique subscriber. Another way, as noted, is to look for polling events that share an IP address 310, user agent 312, and/or some other client value, and measure the extent of those identification errors.

The step of automatically locating a group of the feed polling events may include performing 106 a Fourier, wavelet, or other basis-determination analysis based on occurrence times, performing 108 a select-search-group analysis based on occurrence times, and/or performing 110 an analysis based on one or more client values.

In one embodiment, a Fourier analysis would be performed as follows. First, occurrence times are truncated (or rounded) to the nearest delta multiple during a tolerance-setting step 202. A suitable delta value could be one minute, one second, one hundredth of a second, or some other value, depending on how many event occurrence values there are and how far apart they are. Delta should be chosen such that rounding (or truncating) to the nearest delta multiple results in few, if any, event collisions. Delta usage is meant to reduce computational effort by reducing the number of significant digits being processed, without however reducing the number of events 302 or grossly altering their occurrence times. One of skill should be able to define delta values to meet these criteria, in embodiments that truncate/round to a delta multiple.

Next, the number of events 302 may be culled, or it may be padded with identifiable pseudo-events, until the data being analyzed has N events, where $N=2^p 3^q 5^r$, with p, q and r being integers and $p \geq 1$ and q, $r \geq 0$. For example, $N=48=2^4 \times 3^1$ is one of many suitable values. A dataset size of N in this form makes it easier to perform a Fast Fourier Transform (FFT) of a discrete function over time defined by the events. It will be understood that if an FFT is not used, then culling or padding the set of events in this manner is not required. It will also be understood that some wavelet analyses require $2^s$ data points, $s \geq 1$, in which case different culling or padding may be performed. Culling or padding may be part of the tolerance-setting step 202.

Next, the event groups are defined, using Fourier analysis or another method. The event groups can be viewed as defining basis functions from which a discrete function of all events (or all non-culled events) is formed. Basis functions, Fourier Transforms, Fast Fourier Transforms, definition of discrete functions in terms of a set of basis functions, and related concepts are well documented. Explanations, algorithms, examples, and the like found in the literature may be helpful to a particular reader when designing or implementing a given embodiment of the invention.

In particular, and without limitation, reference may be made to N. Saito, "The Local Fourier Dictionary: A Natural Tool for Data Analysis", *Wavelet Applications in Signal and Image Processing VII* (M. A. Unser et al., eds), Proc. SPIE 3813, pp. 610-6124, 1999. Saito notes in particular that one may need to provide criteria for selecting a basis from among many possible bases; see section 2.4. One such criterion applicable heuristically in an embodiment of the present invention may be to minimize the number of groups. Another heuristic criterion may be to prefer a basis function which is defined by a regular polling interval over one that is not. Another heuristic criterion may be to prefer a basis function defined by a more commonly used polling frequency over one used by a less commonly used polling frequency; the popularity of different polling frequencies is discussed, for instance, in section 4 of H. Liu et al., "Client Behavior and Feed Characteristics of RSS, a Publish-Subscribe System for Web Micronews", Proc. IMC '05: Internet Measurement Conference, pp. 29-34, 2005. Polling frequency statistics may also be gathered from particular sites 420 and used. Another heuristic criterion may be to prefer a basis function which shares a particular client value 306 among most or all of its events 302 over one that does not. These criteria are not necessarily mutually exclusive, and are not necessarily limited to construction of basis functions that use Fourier analysis; they may also be applied in wavelet or search-select-group analyses discussed below.

Some embodiments determine a set of event groups using wavelet analysis. Wavelets in general are widely documented, and they are often discussed in connection with Fourier analysis. For example, a use of wavelets to represent data streams is discussed in A. C. Gilbert et al., "One-pass wavelet decompositions of data streams", *IEEE Transactions on Knowledge and Data Engineering*, vol. 15, no. 3, pp. 541-554, 2003. In particular, and without limitation, one alternative to performing a Fourier analysis would be to use a lifting scheme to perform a wavelet construction. Lifting scheme construction of wavelets for decorrelation of data is discussed, for example, in W. Sweldens, "The Lifting Scheme: A New Philosophy in Biorthogonal Wavelet Constructions", *Wavelet Applications in Signal and Image Processing III* (A. F. Laine et al., eds), Proc. SPIE 2569, pp. 68-79, 1995. It will be appreciated that decomposition of a data set, decorrelation, identification of basis functions, and locating event groups are closely related concepts in the present context.

Some embodiments use a "select-search-group" (SSG) analysis 108 to group 104 events. This terminology was coined for use in the present application, and is shorthand for (a) selecting a feed polling event, (b) searching for other feed polling events at predictable occurrence times in relation to the selected event, and (c) grouping such events. One embodiment of SSG analysis is illustrated in FIG. 2. An optional tolerance-setting step 202 sets time tolerances to reduce computational effort by pinning occurrence times 304 to nearby delta multiples, as discussed above.

An optional sorting step 204 sorts events 302 in order according to their respective occurrence times 204. Any sorting algorithm deemed suitable for a particular implementation may be used, including without limitation an insertion sort, quicksort, merge sort, or bucket sort. Depending on the situation, some or all of the events may already be sorted. For instance, they may have been written in chronological order to a log 502 from which they are then read 102 in order. Merging may be needed in cases in which multiple logs and/or multiple feeds 422 are used 102 as data sources.

FIG. 2 illustrates a situation in which at least some event times are predictable because they are separated by regular polling interval(s). During a polling interval selection step 206, a polling interval is selected. One heuristic approach is to start with a small polling interval, e.g., one minute, and then choose successively larger intervals for repeated iterations through the flowchart shown as fewer and fewer events remain to be grouped. Another heuristic approach is to start with a large polling interval and then choose successively smaller intervals for repeated iterations. Another heuristic approach is to start with a popular polling interval and then choose successively less popular intervals for repeated iterations. Another heuristic approach is to start with a least popular polling interval and then choose successively more popular intervals for repeated iterations. One or more of these approaches may be applied to a given set of events 302. Indeed, multiple approaches could be applied, and the results compared, with groups that are formed 104 under more than one approach being treated as more likely to represent unique subscribers.

During an ungrouped event selecting step 206, an event 302 that has not yet been grouped is selected. One heuristic approach selects the chronologically first ungrouped event; one heuristic approach selects the next event in time order after the last event that was grouped. One approach sorts 204 events not only by time but also by some client value 306, and makes the selection 208 from among ungrouped events having a particular client value. Grouping may thus proceed according to both time and shared client value.

An optional cluster selecting step 210 selects a "cluster", that is, a collection of one or more occurrence time ranges. For instance, interest may be focused on polling events that occur in the evening, so 5 pm through 11 pm each night could be defined as a cluster. Similarly, weekends or holidays might define a cluster. Events may be sorted 204 by clusters.

During a searching step 212, the embodiment searches for more events, using the selected 208 event as a starting point and checking for events at multiples of the selected 206 polling interval. These are events whose occurrence time 204, minus the selected 208 representative event time, minus some integer multiple of the polling interval, is within the selected 202 tolerance of zero. Searches may be limited 214 to a selected 210 cluster and/or limited 216 to events having a particular client value 306 or combination of client values. For example, a search might begin with a polling event which occurred at 1:18 pm from an IP address in a range of addresses assigned to company ABC. The search could then proceed by seeking 212 events from the assigned IP address range 310 that occur within a chosen 202 tolerance of two minutes of 1:38 pm, of 1:58 pm, of 2:18 pm, and so on, for a selected 206 twenty minute polling interval. The search might be further limited 210 to events occurring between 7:00 am and 6:00 pm Eastern Standard Time on a weekday.

It will be understood that searches using different criteria may be performed in different orders. Thus, in general one embodiment might search all events, or a subset having various client values and/or cluster values, for those which occur at a selected polling frequency multiple, and then organize those results according to client values and/or cluster values. By contrast, another embodiment might reverse that order by first separating events into subsets by client values and/or cluster values and then looking within one or more of those subsets for events that occur at regular polling intervals. That is, in one embodiment the step of automatically locating 104 a group of the feed polling events 302 includes grouping 216 polling events according to a selected client value 306 and then checking, within such a group of polling events that share a client value, for polling events which have predictable occurrence times 304 in relation to one another. In another embodiment, locating 104 includes grouping 214 polling events according to a selected first polling event and a selected regular polling interval and then checking, within such a group of regularly occurring polling events, for polling events that share a client value 306.

The steps above may be repeated to form additional groups. For instance, after an initialization phase including at least step 206, a first pass through steps including at least steps 208 and 212 might locate a first group, containing polling events from IP address aaa.bbb.ccc.ddd which occur at 15 minute intervals. A next pass with steps 208, 212, 216 might then identify a second group, containing polling events from IP address aaa.bb.ccc.eee that occur at 15 minute intervals. A next pass might then identify a third group, containing polling events from IP address aaa.bb.ccc.eee that occur at 20 minute intervals. A next pass might then identify a fourth group, containing polling events from IP address aaa.bb.cc.eee that occur at 20 minute intervals using user agent X and a fifth group from the same address at the same interval using user agent Y.

After at least one group is thus located, but not necessarily before all obtained 102 events 302 have been grouped by one or more SSG passes (and/or by Fourier or wavelet analysis 106), a step 112 uses the groupings to estimate feed readership size. If all events have been grouped, then one estimate of readership size is the number of groups. If not all events are grouped, then one way to estimate 112 total readership is by this formula: the readership estimate equals the number of groups, plus the number of remaining ungrouped events divided by the average number of events in a group. Of course, more sophisticated estimates may also be made, using for example the client value and/or cluster value, e.g., readership estimate for cluster K readers equals number of groups in cluster K plus {number of remaining ungrouped events in cluster K divided by average number of events in a cluster K group}, with the total readership estimate being the sum of all the individual cluster readership estimates. The total may include a catch-all cluster, which preferably contains less than five percent of the events.

Configured Media and More

Some embodiments include a computer-readable storage medium 524 such as a flash memory, CD, DVD, removable drive, or the like, which is configured to work in conjunction with a processor to perform a process for estimating the number of unique subscribers to an online syndicated content feed. A hard disk, RAM, tape, or other memory 508 may also be configured to serve as a computer-readable storage medium embodying the invention. It will be understood that method embodiments and configured media embodiments are generally closely related, in the sense that many methods can be implemented using code that configures a medium, and that many configured media are configured by code which performs a method. Those of skill will understand that methods may also be performed using hardwired special-purpose hardware which does not contain a ROM, PROM, EEPROM, RAM, or other memory medium embodying code that performs a method, but such implementations are expected to be unusual because of the generally high cost of implementing methods completely in silicon without a medium containing microcode or other code.

Bearing this in mind, some embodiments (whether method, configured medium, or otherwise) perform a method that includes automatically obtaining 102 data which represent feed polling events, the data comprising signals corresponding to feed polling operations which are performed on behalf of at least two subscribers to the online syndicated content feed, each feed polling event 302 having an occurrence time 304 and at least one client value 306; and automatically locating 104 a plurality of groups of the feed polling events, each such group being characterized in that events in that group have predictable occurrence times in relation to one another and also share at least one client value with one another; whereby the method estimates 112 the number of unique subscribers 404 based at least in part on the number of groups thus located. In some embodiments, the at least one shared client value used in the locating step includes at least one of: a hash value obtained from a header 308 sent 434 by a client 402 which polled the online syndicated content feed 422; a value 316 in a URL to which the client was redirected;

a value 318 stored in a cookie 412 stored on the client; a value 314 stored in a web bug on a web page 504 visited by the client.

The step of automatically locating a plurality of groups may include performing 108 a select-search-group analysis based on occurrence times. In one embodiment, the select-search-group analysis includes selecting 208 a first polling event having an occurrence time; selecting 206 a polling interval; searching 212 for additional polling events which have occurrence times separated from the first polling event's occurrence time by an integer multiple of the selected polling interval; and if said searching identifies at least one additional polling event then grouping 214/216 the one or more identified additional polling events with the first polling event and apart from any remaining polling events. If there remain polling events 302 not yet grouped, the select-search-group analysis may further include another pass, namely, selecting a next polling event from among the remaining ungrouped events, and repeating the searching step and the grouping step each at least once based on that next polling event.

In some cases, a group may be divided by subsequent analysis; in others, two or more groups may be merged by subsequent analysis, whether SSG or other analysis is used. In some embodiments, the select-search-group analysis (or other analysis 106) sorts 204 polling events according to occurrence time. In some embodiments, the method treats two different occurrence times as being the same if they lie within a specified 202 nonzero tolerance of each other. In some, the method estimates 112 the number of unique subscribers by extrapolation after locating a plurality of groups which collectively contain less than half of the obtained polling events, or less than some other specified cutoff.

Data Structures and More

Figure 3:
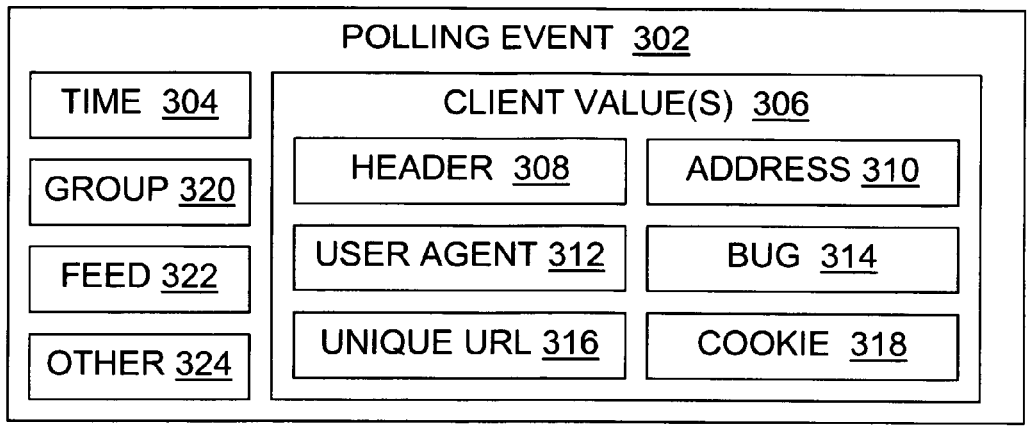
FIG. 3 is a block diagram illustrating a polling event data structure which can be used in methods, systems, and/or configured media according to at least one embodiment of the present invention.

FIG. 3 illustrates an embodiment of a polling event data structure according to the present invention. Polling event structures may be stored in—and thus configure—any computer-readable medium, including removable media 524 or memories 410, 508. Polling event structures may be implemented in C++, Java, XML, Perl, and/or another programming or scripting language, or in a combination of languages. They may be implemented using, or in conjunction with, B-trees, arrays, records, hashes, buckets, indexes, pointers, structs, records, classes, and/or other familiar programming constructs. The data fields shown are illustrative only; other embodiments may exclude some illustrated fields, include other fields, call fields by different names than shown, repeat fields, and/or otherwise diverge from the particular illustration given here while still contributing to an operable embodiment within the scope of the present invention.

In the illustrated polling event 302 data structure, a time field 304 value represents the time at which an identified feed 322 was polled. Field 322 may identify multiple feeds in embodiments that track related feeds together. Multiple feeds may also be tracked in field 322 when the same content is available to users in different formats, e.g., in both RSS and Atom. A group field 320 value specifies at least one group in which the event 302 has been placed 104/214/216; the group field may be implemented as a bit array, pointer, or enum value, for example. Client values 306 may include a hash value 308 obtained from a header sent by a client which polled the online syndicated content feed; an IP address 310 or other address 310 of the polling client; a user agent 312 of the polling client; an identifying GUID or similar value 316 in a unique URL (to which the client may have been redirected); an identifying value 318 stored in a cookie stored on the client; and/or an identifying value 314 stored in a web bug on a web page visited by the client. IP addresses and user agents are often available in headers; they are called out separately in FIG. 3 because they may be especially useful, and to remind readers that headers may also contain other values which can be used according to the invention in distinguishing one group of polling events from another.

Some embodiments of the invention include user registration. Polling events may thus include a pointer, user ID, or other value 324 associating them with a particular registered user. Even if counting registration records provides a nominally exact count of feed users, the invention may be used to compare actual feed usage with expected feed usage. This can help identify cases in which a user password and user name issued to one person is being used (with the legitimate user's knowledge, or not) by another person. Other embodiments do not require user registration, but still provide a useful estimate of the user count; this can be helpful because some people are reluctant to be affiliated with, or to use, feeds that require registration.

Some embodiments include unique URLs, so each subscriber receives a feed which is associated with a URL containing a user-specific identifier 316. In some cases, time-based analysis feed polling can then be helpful to determine that a unique URL has been propagated beyond a single subscriber. Other embodiments do not require unique URLs, but still provide a useful estimate of the user count; this can be helpful because URL generation and tracking mechanisms complicate feed usage in ways that an inventive use of feed polling times does not.

Some embodiments include cookies. In some cases, time-based analysis feed polling can then be helpful to determine that different cookies correspond to a single subscriber. For instance, suppose a sequence of feed polls occur at fifteen minute intervals with first cookie ID 318, and then a polling event occurs at the expected time from the same user agent and an IP address in the same assigned range but without any cookie ID provided. It is reasonable to assume that the user deleted cookies but did not discontinue automatic polling of the feed, so the user count should not be incremented even though a new cookie is generated with a new value 318. Other embodiments do not require cookies, but still provide a useful estimate of the user count; this can be helpful because cookie generation and tracking mechanisms complicate feed usage in ways that an inventive use of feed polling times does not.

Some embodiments include web bugs and corresponding identifying values 314, while others do not. Similar considerations to those discussed above then apply.

Some embodiments rely on IP addresses 310 when counting feed subscribers and/or attempting to identify particular subscribers, while others do not. Similar considerations to those discussed above apply, while bearing in mind that IP addresses can be assigned dynamically and that they are often assigned from a determinable range that is allocated to a particular ISP or a particular large company. For example, if a sequence of feed polls occurs in clusters, but always occurs at an unusual interval, e.g., every twenty-three minutes, within a given cluster, is associated during each cluster with an IP address from the range allocated to a particular ISP, and is the only polling at twenty-three minute intervals from within that IP address range, then it is reasonable to assume 104, 112 that all the polling events from those several clusters are performed on behalf of a single subscriber.

All these examples are merely illustrations of the many ways in which one of skill can put the invention to use.

Systems and More

In addition to the observations above, the following may aid understanding of systems, devices, configured media, and process products of the present invention.

Figure 4:
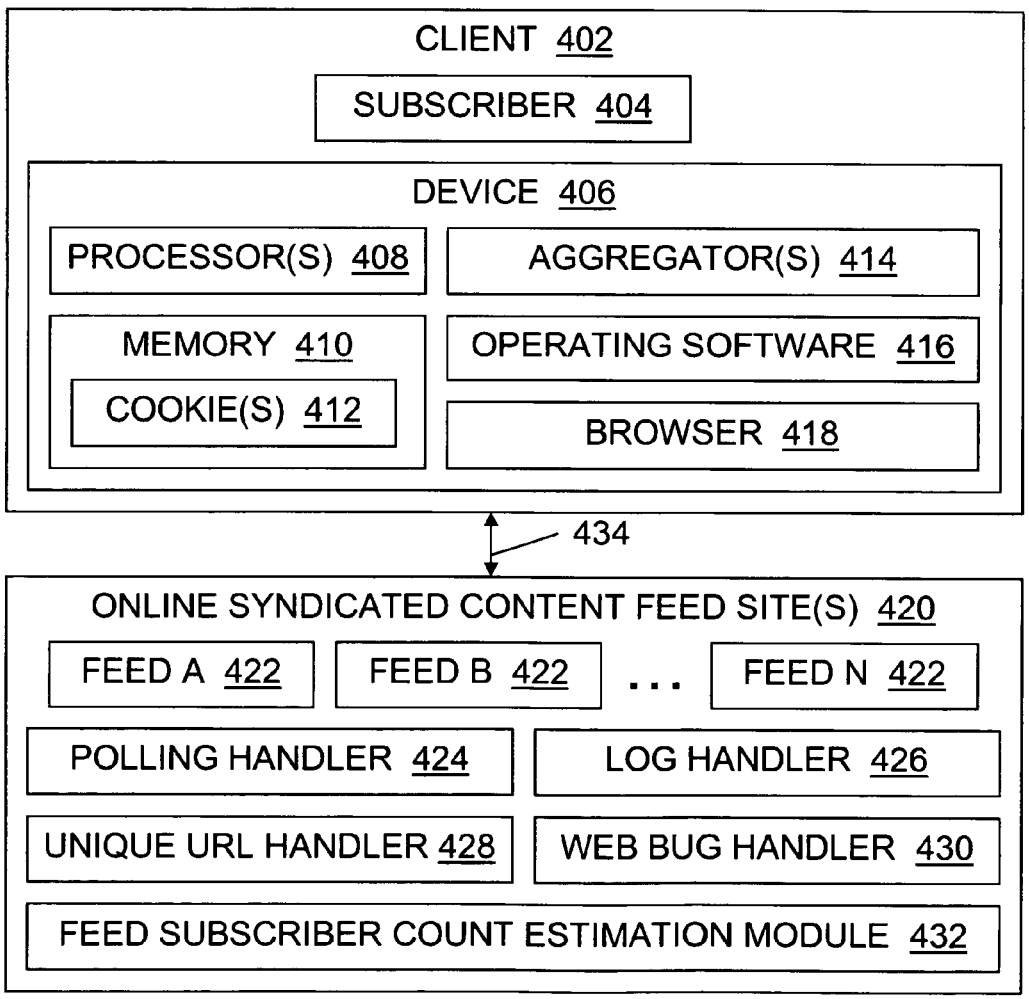
FIG. 4 is a block diagram illustrating roles, data, information flow, systems, methods, and other aspects of some embodiments of the present invention.

FIG. 4 illustrates a client 402 in communication 434 with an online feed site 420. The client is operating on behalf of one or more subscribers 404. From the feed metrics system 506 perspective, the communication is with a client computer, cell phone, or other device 406. One possible benefit of the present invention is that it may help identify and/or count the subscribing person(s) 404 that correspond(s) in some manner to the client 402, when the mapping between clients and subscribers is not necessarily one-to-one.

The device 406 has one or more CPUs or other digital processing units 408 which operate in controlled interactions with a RAM and/or other memory 410. The processor, for instance, runs some kind of aggregator 414 software that polls 434 the feed site for new content and brings 434 the content over a network to the local memory 410 from which is it displayed to the user 404 in a browser 418 or in the aggregator. Operating system software 416, file system software 416, networking software 416 and other operating software provide a user interface 522, communications capability, possibly some security, and so on. Hardware-only implementations of the aggregator 414 and/or other software 416, 418 may also be possible for a given embodiment. The general trade-offs between software and hardware functionality, with their cost, implementation time, and other concerns, can be applied by those of skill to embodiments of the present invention.

A polling handler 424 "component" (that is, software configuring general-purpose hardware, or special-purpose hardware) responds to polling inquiries 434, and in some embodiments tracks polling activity in real-time for real-time analysis 104. A log handler component 426 in some embodiments writes polling events to a log, for later non-real-time analysis 104. A unique URL handler component 428 in some embodiments generates, tracks, and analyzes 104 unique URL identifiers in conjunction with time-based analysis 106/108 and/or client-value-based analysis 110 to estimate 112 readership. A web bug handler component 430 in some embodiments generates, tracks, and analyzes 104 web bug identifiers in conjunction with time-based analysis 106/108 and/or client-value-based analysis 110 to estimate 112 readership. The components 424 through 430 may be implemented as separate modules, or as part of the readership estimation module 432. The readership estimation module 432 performs a method such as one of the methods discussed in connection with FIG. 1, for instance.

In the configuration shown in FIG. 4, feed subscriber estimation functionality 432 is on the same server(s) as the feeds 422. In the configuration shown in FIG. 5, by contrast, a feed metrics system 506 on machine(s) other than the feed server(s) runs the feed subscriber estimation software 432. This difference is shown in the illustrations to emphasize that it is the functionality provided that matters most, rather than the location of the functionality in a particular implementation.

Figure 5:
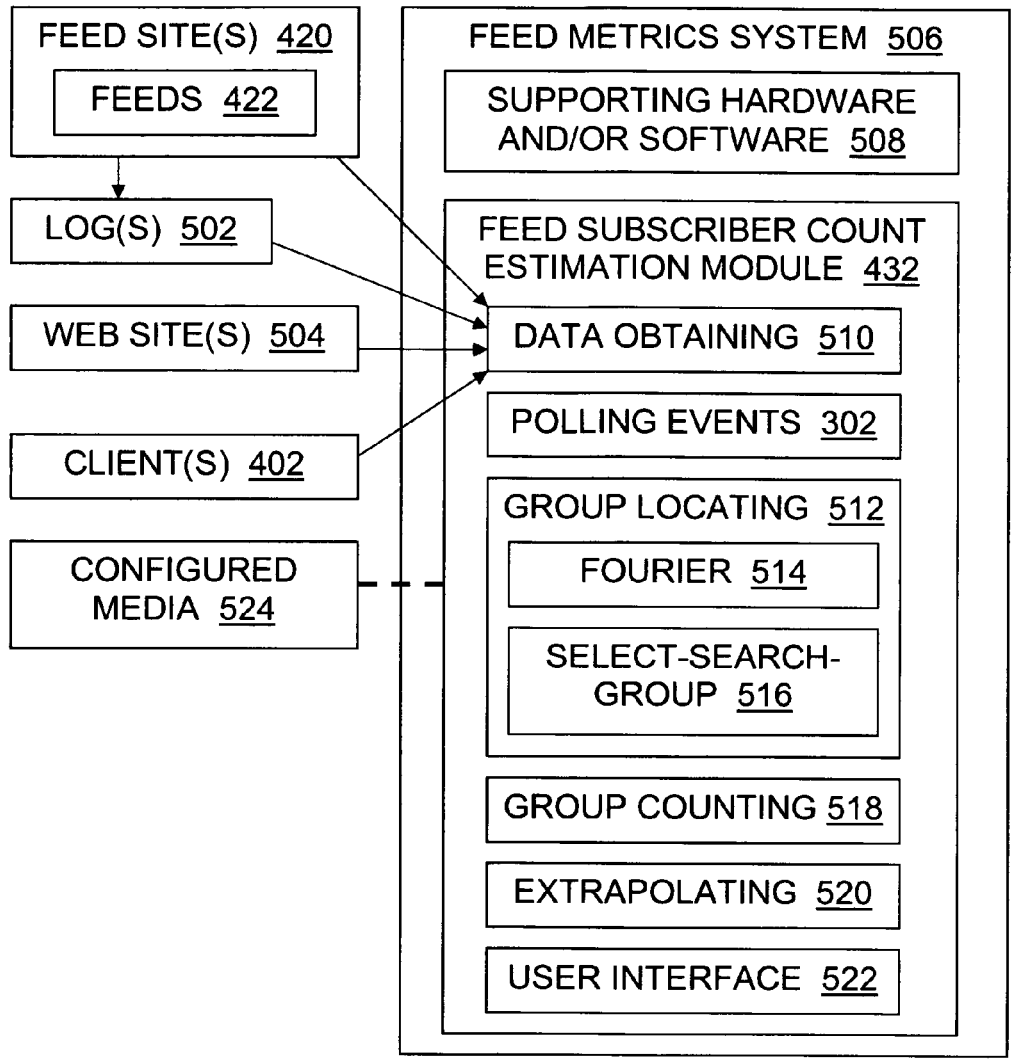
FIG. 5 is a block diagram further illustrating roles, data, information flow, systems, methods, and other aspects of some embodiments of the present invention.

As indicated by FIG. 5, in some embodiments the feed metrics system 506, which is used to analyze and present data representing human-initiated or -controlled 404 activity in the feed site 420, includes a data obtaining means 510 for obtaining polling event data which represent activity in the feed site. The data obtaining means includes computer processing and memory hardware 508 configured by at least one of the following: software which extracts data about the feed site 420 and/or feed 422 from a server logfile 502, software which collects feed polling information using tagged content or using another real-time feed tracking mechanism. In particular embodiments, the data obtaining means 510 obtains feed polling data for at least one of: an RSS feed, an Atom feed.

In some embodiments the feed metrics system 506 includes software and possibly supporting hardware 508 for performing an estimating step 112, that is, a component 520 for estimating the number of unique subscribers to an online syndicated content feed by at least counting distinct groups of feed polling events.

In some embodiments the feed metrics system 506 includes a group locating means 512 for locating a group of the feed polling events which is characterized in that events in that group have predictable occurrence times in relation to one another and also share at least one client value with one another. The group locating means 512 includes computer processing and memory hardware 508 configured by at least one of the following: software 514 which performs 106 a Fourier or wavelet analysis; software 516 which performs 108 an SSG analysis; software which performs 110 a client-values based analysis; software which performs an analysis illustrated at least in part by at least some of the steps shown FIG. 2.

In particular embodiments, the group locating means 512 locates a group whose data events share a client value obtained from at least one of: an IP address of a client that polled the online syndicated content feed; at least a portion of a user agent header sent by a client that polled the online syndicated content feed. In particular embodiments, the group locating means 512 locates a group whose data events occur at times separated, to within a specified tolerance, by an integer multiple of at least one of the following polling intervals: ten minutes, fifteen minutes, thirty minutes, one hour. In particular embodiments, the group locating means 512 locates a group whose data events occur in clusters defined by at least one of: time of day, day of week.

In some embodiments the feed metrics system 506 includes a counting means 518 for counting a plurality of distinct groups which are located with the group locating means. This may include software for counting the number of different group IDs 320 in use for a given set of data events; software for incrementing a group count and marking grouped events grouped/deleted; and/or other software for tallying groups.

As an additional example, in some embodiments, the system 506 implements a method that obtains 102 a set of RSS/ATOM feed polling events. It then looks 104 for a subset of feed polling events which occur at predictable time intervals and which also share a hash value, where the hash value is based on one or more elements of an HTTP GET header (IP address, user agent, etc.). It then treats the subset as corresponding to a unique subscriber to the RSS/ATOM feed. The set of RSS/ATOM feed polling events can be obtained by reading/parsing a server log, and/or by tracking the polling as it occurs in real-time. The subset of events that occur at predictable time intervals can be identified using Fourier analysis and/or search algorithms, based on assumptions about likely polling intervals/times. These methods can be combined with other approaches, including without limitation redirection to unique URLs, webbugs, cookies.

Figure 6:
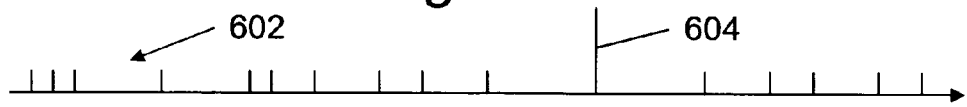
FIG. 6 is a histogram of a hypothetical example set of feed polling events occurring over time.
Figure 7:
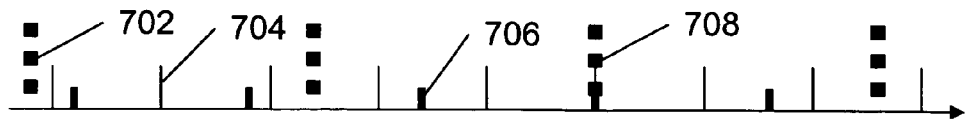
FIG. 7 is a diagram illustrating three groups of feed polling events located using an analysis of the events illustrated in FIG. 6.

FIGS. 6 and 7 provide another example. FIG. 6 is a diagram in which short narrow vertical line segments 602 represent a small set of hypothetical polling events that are arranged in chronological order, with time increasing as one moves from left to right. The spike 604 represents three events which occurred at the "same" time, that is, within some chosen tolerance of a multiple of a regular polling interval. The polling interval is some convenient unit, e.g., five minutes. FIG. 7 is a diagram showing the result of performing step 104 on the data of FIG. 6. One located 104 group of events is now indicated by three vertical squares, e.g., at 702. A second located 104 group of polling events is indicated by mid-height narrow line segments, e.g., at 704. A third (and in this hypothetical, final) located 104 group of polling events is indicated by short wide line segments, e.g., at 706. In this example, the three events that occurred at the same time, as indicated at 604, each belong to a different group, as indicated at 708. The estimated readership in this hypothetical example would be three, based on the identification of three groups. This example shows one of the many possible ways in which a stream or other set of feed polling events 302 could represent—and be decomposed into—several (or many) groups based at least in part on regular polling intervals or other predictability in their times of occurrence.

As noted above, steps and other features are not necessarily limited to a particular embodiment, except as required for operability and/or required by the claims. Thus, the features of methods, process products, and/or systems may likewise appear in one another and/or in configured storage media.

CONCLUSION

Although particular embodiments of the present invention are expressly illustrated and described herein as methods, for instance, it will be appreciated that discussion of one type of embodiment also generally extends to other embodiment types. For instance, the descriptions of feed site analytics methods also help describe feed site analytics systems. It does not follow that limitations from one embodiment are necessarily read into another.

Headings are for convenience only; information on a given topic may be found outside the section whose heading indicates that topic. All claims as filed are part of the specification and thus help describe the invention, and repeated claim language may be inserted outside the claims as needed.

It is to be understood that the above-referenced embodiments are illustrative of the application for the principles of the present invention. Numerous modifications and alternative embodiments can be devised without departing from the spirit and scope of the present invention. While the present invention has been shown in the drawings and described above in connection with the exemplary embodiments of the invention, it will be apparent to those of ordinary skill in the art that numerous modifications can be made without departing from the principles and concepts of the invention as set forth in the claims.

As used herein, terms such as "a" and "the" and designations such as "polling event" and "locating" are inclusive of one or more of the indicated item or step. In particular, in the claims a reference to an item generally means at least one such item is present and a reference to a step means at least one instance of the step is performed.

I claim:

1. A method of identifying a likely unique subscriber to an online syndicated content feed, the method comprising:

automatically obtaining data which represent feed polling events, the data comprising signals corresponding to feed polling operations which are performed on behalf of at least two subscribers to the online syndicated content feed, each feed polling event having an occurrence time and also having at least one client value; and automatically grouping at least a subset of the obtained feed polling events into a group which corresponds to the likely unique subscriber using occurrence times and predictability of feed polling events by locating a group of feed polling events which have predictable occurrence times in relation to one another and also share at least one client value with one another, and thus are likely performed on behalf of the unique subscriber;

whereby through operation of a digital processing unit in controlled interaction with a computer-readable medium the method automatically identifies the likely unique subscriber by using the located group.

2. The method of claim 1, wherein the step of automatically obtaining data comprises at least one of: parsing a server log, tracking feed polling in real-time.

3. The method of claim 1, wherein the step of automatically locating a group of the feed polling events comprises at least one of: performing a Fourier analysis based on occurrence times; performing a wavelet analysis based on occurrence times; performing a select-search-group analysis based on occurrence times.

4. The method of claim 1, wherein the step of automatically locating a group of the feed polling events comprises at least one of:

grouping polling events according to a selected client value and then checking, within such a group of polling events that share a client value, for polling events which have predictable occurrence times in relation to one another;

grouping polling events according to a selected first polling event and a selected regular polling interval and then checking, within such a group of regularly occurring polling events, for polling events that share a client value.

5. The method of claim 1, wherein the at least one shared client value used in the locating step includes at least one of: a hash value obtained from a header sent by a client which polled the online syndicated content feed; a unique identifier value in a URL; a value stored in a cookie stored on the client; a value stored in a web bug on a web page visited by the client.

6. A feed metrics system capable of estimating the number of unique subscribers to an online syndicated content feed by at least counting distinct groups of feed polling events, comprising:

a data obtaining means for obtaining data which represent feed polling events, the data obtaining means comprising computer processing and memory hardware configured by software, the data comprising signals which configure a memory and correspond to feed polling operations which are performed on behalf of at least two subscribers to the online syndicated content feed, each feed polling event having an occurrence time and also having at least one client value;

a group locating means for grouping at least a subset of the obtained feed polling events into a group which corresponds to a likely unique subscriber using occurrence times and predictability of feed polling events by locating a group of feed polling events which have predictable occurrence times in relation to one another and also share at least one client value with one another, and thus are likely performed on behalf of the unique subscriber; and a counting means for counting a plurality of distinct groups which are located with the group locating means;

whereby the system identifies the unique subscriber using a group located by the group locating means.

7. The system of claim 6, wherein the data obtaining means comprises computer processing and memory hardware configured by at least one of the following: software which extracts feed polling data from a server logfile, software which collects feed polling data in real-time.

8. The system of claim 6, wherein the data obtaining means obtains feed polling data for at least one of: an RSS feed, an Atom feed.

9. The system of claim 6, wherein the group locating means locates a group whose data events share a client value obtained from at least one of: an IP address of a client that polled the online syndicated content feed; at least a portion of a user agent header sent by a client that polled the online syndicated content feed.

10. The system of claim 6, wherein the group locating means locates a group whose data events occur at times separated, to within a specified tolerance, by an integer multiple of at least one of the following polling intervals: ten minutes, fifteen minutes, thirty minutes, one hour.

11. The system of claim 6, wherein the group locating means locates a group whose data events occur in clusters according to at least one of: time of day, day of week.

12. A computer-readable storage medium which is configured to work in conjunction with a processor to perform a process for estimating the number of unique subscribers to an online syndicated content feed, the method comprising:
   automatically obtaining data which represent feed polling events, the data comprising signals corresponding to feed polling operations which are performed on behalf of at least two subscribers to the online syndicated content feed, each feed polling event having an occurrence time and at least one client value; and
   automatically grouping at least a subset of the obtained feed polling events into groups which correspond to respective likely unique subscribers using occurrence times and predictability of feed polling events by locating a plurality of groups of the feed polling events, each such group being characterized in that events in that group have predictable occurrence times in relation to one another and also share at least one client value with one another;
   whereby the method identifies unique subscribers and estimates the number of unique subscribers based at least in part on the number of groups thus located.

13. The configured medium of claim 12, wherein the at least one shared client value used in the locating step includes at least one of: a hash value obtained from a header sent by a client which polled the online syndicated content feed; a value in a URL to which the client was redirected; a value stored in a cookie stored on the client; a value stored in a web bug on a web page visited by the client.

14. The configured medium of claim 12, wherein the step of automatically locating a plurality of groups comprises performing a select-search-group analysis based on occurrence times.

15. The configured medium of claim 14, wherein the select-search-group analysis comprises:
   selecting a first polling event having an occurrence time;
   selecting a polling interval;
   searching for additional polling events which have occurrence times separated from the first polling event's occurrence time by an integer multiple of the selected polling interval; and
   if said searching identifies at least one additional polling event then grouping the one or more identified additional polling events with the first polling event and apart from any remaining polling events.

16. The configured medium of claim 15, wherein there are remaining polling events not yet grouped, and the select-search-group analysis further comprises selecting a next polling event from among them, and repeating the searching step and the grouping step each at least once based on that next polling event.

17. The configured medium of claim 14, wherein the select-search-group analysis comprises sorting polling events according to occurrence time.

18. The configured medium of claim 12, wherein the method treats two different occurrence times as being the same if they lie within a specified nonzero tolerance of each other.

19. The configured medium of claim 12, wherein the method estimates the number of unique subscribers by extrapolation after locating a plurality of groups which collectively contain less than half of the obtained polling events.

20. The configured medium of claim 12, wherein the step of automatically locating a plurality of groups comprises performing at least one of: a Fourier analysis, a wavelet analysis, based on polling event occurrence times.

21. A process for estimating feed readership, comprising:
   receiving a feed server logfile with polling event times and at least one client value at a feed metrics system for analysis;
   automatically grouping feed polling events into groups which correspond to respective likely unique subscribers using occurrence times and predictability of feed polling events by locating a plurality of groups of the feed polling events, each such group being characterized in that events in that group have predictable occurrence times in relation to one another and also share at least one client value with one, another; and
   through operation of a digital processing unit, in controlled interaction with a computer-readable medium of the feed metrics system, automatically identifying unique subscribers with located groups and sending a readership estimation based on and referring to the grouped feed polling events and the identified unique subscribers.

* * * * *

UNITED STATES PATENT AND TRADEMARK OFFICE
CERTIFICATE OF CORRECTION

PATENT NO. : 7,620,697 B1
APPLICATION NO. : 11/373381
DATED : November 17, 2009
INVENTOR(S) : Trenton Davies It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 801 days.

Signed and Sealed this

Twenty-sixth Day of October, 2010

David J. Kappos
*Director of the United States Patent and Trademark Office*